W. B. SPENCER.
BUTTER SEPARATOR.
APPLICATION FILED JAN. 24, 1910.
977,050.
Patented Nov. 29, 1910.
2 SHEETS—SHEET 1.
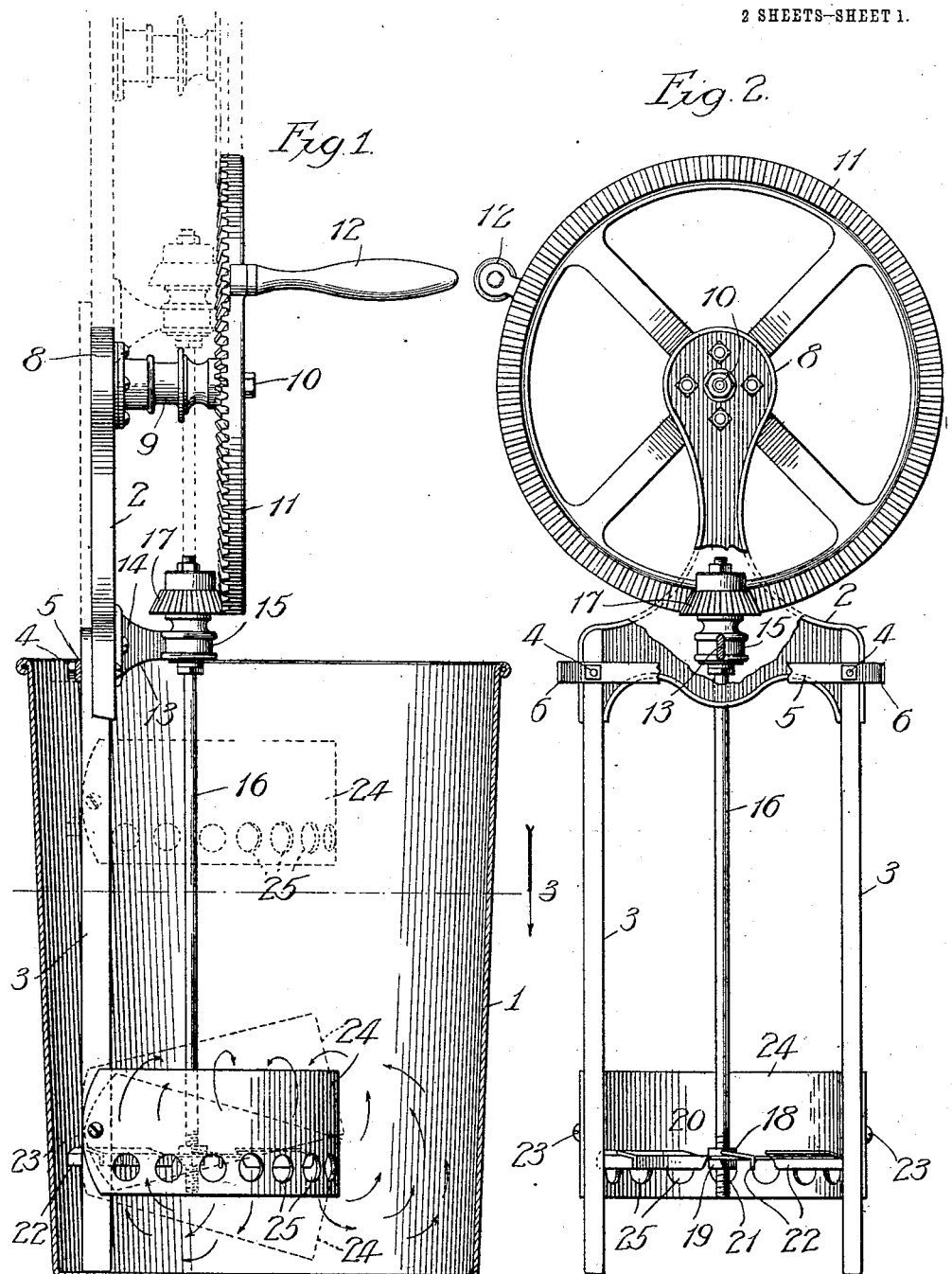
Witnesses:
John Enders
Chas. H. Buell
Inventor:
William B. Spencer
By David H. Fletcher,
Atty.

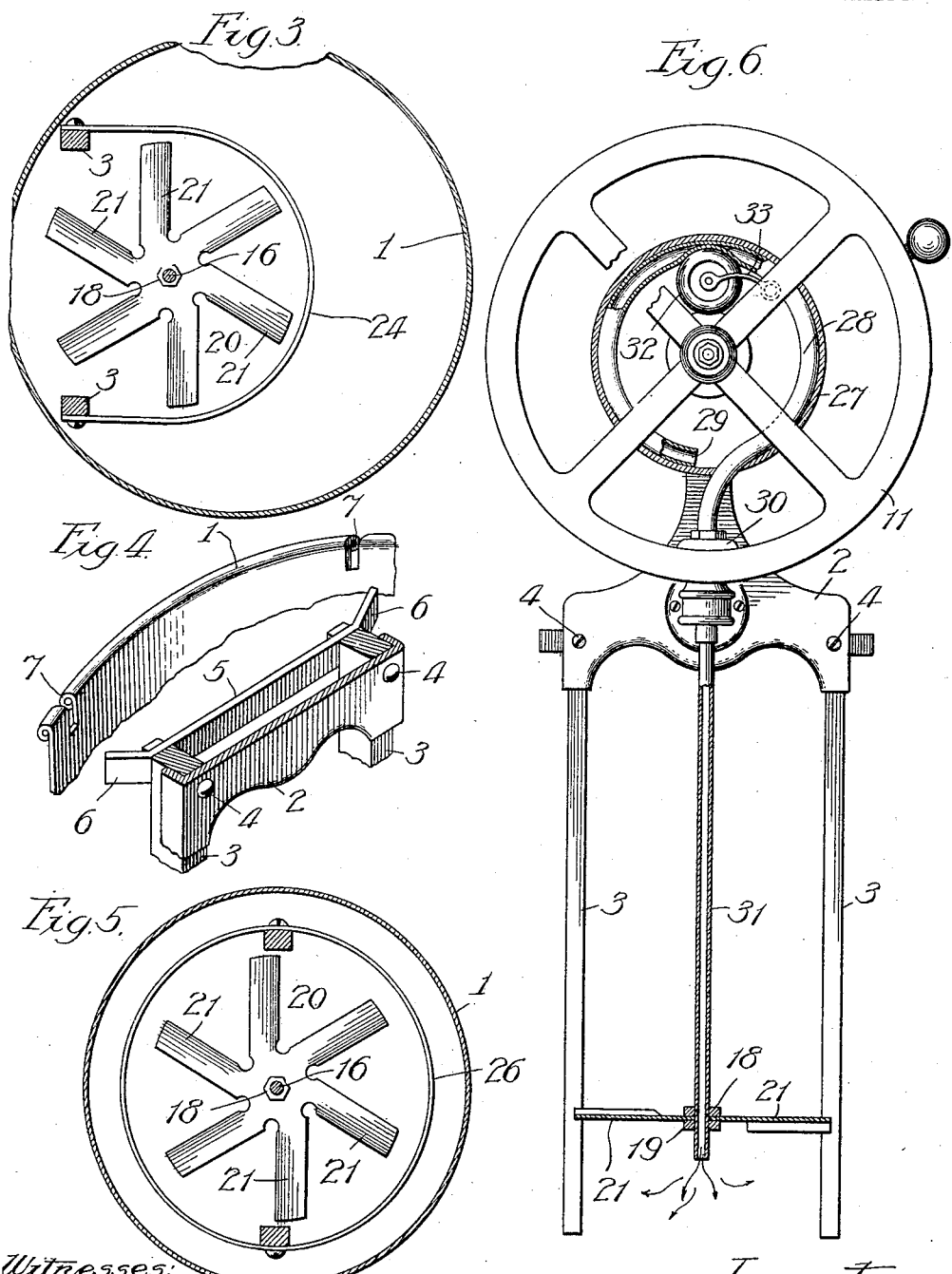

UNITED STATES PATENT OFFICE.

WILLIAM B. SPENCER, OF CHICAGO, ILLINOIS.

BUTTER-SEPARATOR.

977,050.   Specification of Letters Patent.   Patented Nov. 29, 1910.

Application filed January 24, 1910. Serial No. 539,837.

*To all whom it may concern:*

Be it known that I, WILLIAM B. SPENCER, a citizen of the United States, residing at Chicago, in the county of Cook and State of Illinois, have invented certain new and useful Improvements in Butter-Separators, of which the following is a description, reference being had to the accompanying drawings, forming a part of this specification, in which corresponding letters of reference in the different figures indicate like parts.

The object of my invention is to provide a simple, cheap and efficient form of churn or separating device for separating butter from cream, which device shall be so constructed as to not only cut or break the fat globules but to cause a violent agitation of the liquid in the nature of a "vortex whirl" so as not only to bring all of the liquid in substantially uniform contact with the beaters, but to thoroughly aerate the same during the operation, all of which is hereinafter more particularly described and definitely pointed out in the claims.

In the drawings, Figure 1 is a side elevation of a butter separator embodying the features of my invention, the cream receptacle being shown in vertical section; Fig. 2 is a rear elevation of the device as it would appear when removed from the receptacle, a portion of the frame being broken away; Fig. 3 is a plan view taken upon the line 3—, Fig. 1; Fig. 4 is a detail view in perspective showing means for attaching the frame to the receptacle; Fig. 5 is a sectional view in plan similar to that shown in Fig. 3, and illustrating a modified construction, and Fig. 6 is an elevation of a modified construction, portions of which are shown in section, the receptacle being omitted.

Referring to the drawings, 1, Figs. 1 and 4, indicates a receptacle of any approved construction, preferably open at the top, which is adapted to receive my improved separator. A metal frame 2 is provided with upright supports 3, 3, which are adjustably secured thereto by means of bolts 4 or otherwise, so as to enable the frame portion 2 to be raised or lowered as indicated in dotted lines in Fig. 1, for the purpose hereinafter stated. A horizontal cross-bar 5 is rigidly attached to the upper part of said frame by means of said bolts, the ends of said bar being bent at an angle to the body as shown at 6, Figs. 2 and 4, for the purpose of securing the frame of the machine to the receptacle 1. This may be accomplished in any approved way, such for example as providing notches 7, in the upper edge of the receptacle for the reception of the parts 6, or any suitable clamps or lugs adapted to engage them. When so engaged the supports 3 are held within the receptacle in the manner indicated in Fig. 1. Extending upwardly from the main portion of the frame 2 and integral therewith is a head 8 having a stud 9 bolted thereto which is provided with a wrist-pin 10 upon which is journaled a driving gear 11 having a handle 12. A bracket 13 is rigidly attached to the frame by means of bolts 14 and is provided with a head 15 in which is journaled a vertical shaft 16 having a pinion 17 rigidly attached in any approved way to its upper end.

Rigidly attached to the lower end of the shaft by means of nuts 18, 19 is a rotary agitator or beater generally designated by 20, which is provided with blades preferably formed from sheet metal, each of which is provided with a wide horizontal body 21 and a flange 22 upon its rear edge and extending downwardly therefrom preferably at right angles to said body.

Attached to the uprights 3 by means of screws 23 is a casing or shield 24, which is arranged to extend partially around the beater. Said casing is preferably provided with openings 25 near its lower edge and is pivotally supported upon the screws 23 to enable it to be adjusted to varying angles as indicated in dotted lines in Fig. 1, so that in case the uprights 3 are inserted in the receptacle at an angle from the vertical, the casing may be adjusted accordingly.

The operation of the device is as follows: The turning of the crank actuates the shaft and causes the agitator to rotate rapidly. The sharp edges of the blades 21 as well as those of the flanges serve to break the fat globules and to free the butter fat, while said flanges have the effect to deflect the liquid current downwardly and to cause an eddy or vortex around the shield 24 in the manner indicated by the arrows shown in Fig. 1. The result is that the surrounding air is drawn into the vortex and thoroughly commingled with the liquid.

Inasmuch as the action of the flanged blades serves to force the liquid downwardly as described, I prefer to make the device adjustable by raising or lowering the frame portion 2 upon the uprights 3 so that the agitator may be kept near to the top of the liquid. The shield or casing 24 aids materially in producing the vortex action described, thereby increasing the quantity of air which is brought into contact with the cream. In the example shown in Figs. 1, 2 and 3 the shaft is placed away from the center of the receptacle. In such cases I prefer to extend the shield only partially around the agitator leaving the wall of the receptacle to fill the remaining space.

In Figs. 5 and 6 I have shown a modification in which the shield 26 is made circular and extended entirely around the agitator with which it is concentric. I have also in this construction provided additional means for forcing air into the cream.

Rigidly attached to the upper portion of the frame 2 is a ring 27, the inner face of which is grooved in cross-section to permit the insertion therein of a flexible tube 28, one end 29 of which is open. The other end is extended downwardly and connected by means of a tight joint to a union 30, which is swiveled to the upper end of a hollow shaft 31. A roller 32 is supported upon an arm 33 attached to one of the spokes of the gear-wheel 11. The roller serves to compress the tube in the manner shown, and as the crank is rotated the air which enters the tube at the open end is forced forward and downwardly into the cream from the lower end of the hollow shaft.

Having thus described my invention, I claim:

1. A separator of the class described in which is combined a rotary agitator mounted upon a vertical shaft, said agitator having horizontally arranged knife-like blades with depending flanges at the rear, means for rotating said agitator, and a peripheral shield near the ends of said blades, the plane of the shield being at an angle to that of the blades.

2. A separator of the class described in which is combined a rotary agitator mounted upon a vertical shaft, said agitator having substantially horizontally arranged knife-like blades with depending flanges at the rear, a peripheral perforated shield near the ends of said blades, and means for rotating said agitator.

3. A separator of the class described in which is combined an agitator mounted upon a rotary shaft, said agitator being provided with blades having means thereon for inducing a vortex-whirl in the liquid in which they are rotated, means for actuating said shaft, a peripheral shield in proximity to the ends of said blades, and means for adjusting said shield at varying angles.

4. A separator of the class described in which is combined an agitator mounted upon a hollow rotary shaft, said agitator being provided with blades having means thereon for inducing a vortex-whirl in the liquid in which they are rotated, means for actuating said shaft, a collapsible tube having one end jointedly connected with said hollow shaft while the other end is open to the air, the body of said tube being supported in curved form, and means for compressing said tube from its open end toward said shaft to force air into the latter and thence into the liquid beneath the agitator.

In testimony whereof, I have signed this specification in the presence of two subscribing witnesses, this fifteenth day of November 1909.

WILLIAM B. SPENCER.

Witnesses:
D. H. FLETCHER,
CARRIE E. JORDAN.